(12) United States Patent
Ishii et al.

(10) Patent No.: US 6,833,895 B2
(45) Date of Patent: Dec. 21, 2004

(54) LIQUID CRYSTAL DISPLAY DEVICE AND FABRICATION METHOD THEREOF

(75) Inventors: Akira Ishii, Mobara (JP); Miyo Shimizu, Mobara (JP); Shigeru Matsuyama, Mobara (JP)

(73) Assignees: Hitachi Displays, Ltd., Chiba-ken (JP); Hitachi Device Engineering Co., Ltd., Chiba-ken (JP)

( * ) Notice: Subject to any disclaimer, the term of this patent is extended or adjusted under 35 U.S.C. 154(b) by 108 days.

(21) Appl. No.: 10/411,196

(22) Filed: Apr. 11, 2003

(65) Prior Publication Data

US 2003/0202142 A1 Oct. 30, 2003

(30) Foreign Application Priority Data

Apr. 26, 2002 (JP) .......................... 2002-126578

(51) Int. Cl.[7] .................... G02F 1/1333; G02F 1/1343; G02F 1/1339
(52) U.S. Cl. ................... 349/122; 349/139; 349/155
(58) Field of Search ....................... 349/122, 139, 349/155

(56) References Cited

U.S. PATENT DOCUMENTS 5,677,053 A * 10/1997 Moriga et al. ............ 428/347
6,136,444 A * 10/2000 Kon et al. ................ 428/423.1

FOREIGN PATENT DOCUMENTS

| JP | 63-309921 | 6/1987 |
|---|---|---|
| JP | 5-140267 | 11/1991 |
| JP | 8-234188 | 2/1995 |
| JP | 2000-171785 | 12/1998 |
| JP | 2000-171785 | * 6/2000 |

OTHER PUBLICATIONS

Mamoru Takeda, Shinichi Kogo, Tatsuhiko Tamura, Hiroaki Ueura, Hitoshi Noda, Ichiro Yamashita, Takao Kawaguchi, Ohkura Ano, Akira Kuroda, "12.5–Inch Active Matrix Color Liquid Crystal (LC) Display Adopting Redundant Configuration", Thesis, Nikkei Electronics, 1986. 12. 15 (No. 4:0). In Japanese and in English.

* cited by examiner

Primary Examiner—Tarifur R. Chowdhury
Assistant Examiner—Mike Qi
(74) Attorney, Agent, or Firm—Reed Smith LLP; Stanley P. Fisher, Esq.; Juan Carlos A. Marquez, Esq.

(57) ABSTRACT

In a liquid crystal display device comprising a substrate which has an organic material film (e.g. a leveling layer, or an alignment film) and a conductive oxide film (e.g. an electrode) covering at least a part of the organic material film both formed on an inner surface thereof facing a liquid crystal layer, the present invention provides the conductive oxide film formed at a temperature being neither higher than a thermal decomposition temperature of the organic material film nor lower than a heat deflection temperature of the organic material film, so as to prevent blebs from foaming from the organic material film and appearing in the liquid crystal layer even after a long term storage of the liquid crystal display device or even external force applied to the liquid crystal display device.

8 Claims, 5 Drawing Sheets

LIQUID CRYSTAL DISPLAY DEVICE AND FABRICATION METHOD THEREOF

BACKGROUND OF THE INVENTION

1. Field of the Invention

The present invention relates to a liquid crystal display device, and more particularly to a liquid crystal display device which prevents a defective display by suppressing the generation of gas from thin films made of various organic materials which are formed on an inner surface of a substrate, and a fabrication method of the liquid crystal display device.

2. Description of the Related Art

As display devices for personal computers, word processors and other information equipment, recently, thin and light-weighted display devices of low power consumption which use liquid crystal display elements have been popularly used. The liquid crystal display element is basically configured such that a matrix is formed of a large number of electrodes which are arranged horizontally and vertically, a liquid crystal layer is formed between the above-mentioned horizontal and vertical electrodes, and each pixel is formed at a portion where two electrodes face each other in an opposed manner. Due to such a constitution, the liquid crystal display element can display a two-dimensional image.

This type of liquid crystal display device is classified into a so-called single matrix type liquid crystal display device in which given pixels are selected at timings of pulses applied to the horizontal and vertical electrodes and a so-called active matrix type liquid crystal display device in which a non-linear type element such as a transistor is arranged for every pixel which is formed at a crossing point of the vertical and horizontal electrodes and given pixels are selected.

For example, in a liquid crystal display device which uses active-matrix type liquid crystal display elements, non-linear elements (switching elements) are formed corresponding to a plurality of respective pixel electrodes arranged in a matrix array. Liquid crystal in each pixel is theoretically always driven (duty ratio: 1.0) and hence, compared to the so-called single matrix type which adopts a time-division driving method, the active matrix type shows a more favorable contrast. Accordingly, the active matrix type has been considered as an indispensable technique in the color liquid crystal display device. As a typical example of the switching element, a thin film transistor (TFT) is named.

The active matrix type liquid crystal display device which uses the thin film transistors is known through, for example, JP-A-63-309921 or "12.5 type active matrix type color liquid crystal display adopting a redundancy constitution" (Nikkei Electronics, 193–210 pages, Dec. 15, 1986, published by Nikkei McGraw-Hill Ltd.).

Further, in the color liquid crystal display device of this type, a plurality of color filters (generally red, green and blue) are provided to one substrate (color filter substrate, hereinafter referred to as "counter substrate") out of a pair of substrates which sandwich a liquid crystal layer. In general, the color filters are formed by applying organic materials in which organic colored material such as dyes or pigments are mixed and patterning is repeated for respective three color filters using a photolithography method. Here, a light shielding film, that is, a black matrix which separates respective colors is formed by a similar technique before or after forming the color filters.

Further, to level an inner surface of a color filter substrate for making a gap defined between opposing faces of a pair of substrates, that is, a cell gap, uniform, a leveling layer (protective film: overcoat layer) made of organic material as disclosed in JP-A-5-140267, for example, is formed on color filters so as to cover the color filters.

In the liquid crystal display device which is constituted by laminating the color filter substrate on which such a thin film made of organic material or the like is formed to another substrate (active matrix substrate, hereinafter referred to as "electrode substrate"), there has been a drawback that bubbles are generated when an impact is applied to the liquid crystal display device.

To cope with such a drawback, conventionally, as disclosed in JP-A-8-234188, a method which bakes a so-called empty cell before laminating a color filter substrate and an active matrix substrate to each other and filling liquid crystal between the substrates using an absorption gas removing processing which is mainly represented by hydrated water has been adopted without any concrete aims.

Further, JP-A-2000-171785 discloses an invention in which by using a thin organic material film which exhibits an integrated quantity of detected ion intensity of carbon dioxide measured from room temperature to 250 degree centigrade (Celsius: ° C.) of equal to or less than 70000 when a liquid crystal display device is subjected to temperature elevation using a heating and gas generating device, the generation of bubbles when an impact is applied to a display screen of the liquid crystal display device can be suppressed.

SUMMARY OF THE INVENTION

Usually, in a liquid crystal display device which uses a counter substrate on which color filters are formed, a major portion of a substrate constituting element of the counter substrate is, different from an electrode substrate, made of organic material. Accordingly, the counter substrate per se has a gas generating potential or generates a decomposing gas by a damage due to an external factor and hence, it has been confirmed that when the liquid crystal display device is stored or used at a normal temperature and a normal pressure, gas is dissolved in the liquid crystal.

When the gas which is dissolved in the liquid crystal in this manner, due to the characteristics of the liquid crystal display device which is constituted of a substrate having high flexibility such as the counter substrate formed of a thin glass substrate which is generally liable to be easily deformed due to an external force, when a display screen is pushed with a finger or an impact is applied to the display screen due to a fall of the liquid crystal display device, bubbles are generated in the liquid crystal display device and this may cause a defective display.

Further, when the gas is dissolved into the inside of the liquid crystal, the characteristics of the liquid crystal display per se, for example, a resistivity of the liquid crystal is degraded and this may cause a defective display.

Accordingly, it is an object of the present invention to provide a liquid crystal display device which ensures high reliability by preventing the generation of bubbles from various thin formed films, particularly from organic material films such as a leveling layer even when the liquid crystal display device is stored for a long time or even when an external force is applied to the liquid crystal display device during use thereof.

To achieve the above-mentioned object, the present invention is characterized in that in a liquid crystal display device which arranges a pair of substrates having organic thin films such as leveling layers and forming orientation films for orienting liquid crystal molecules constituting liquid crystal on uppermost layers of inner surfaces thereof to face each other in an opposed manner with a fixed gap and adheres both peripheries of the substrates with a sealing material and fills liquid crystal in the gap hermetically, the characteristics of the organic thin film and the forming temperature of a thin film of an oxide conductive film are specified.

One typical example of the liquid crystal display device according to the present invention is described as following structures (1) to (5).

Structure (1):

In a liquid crystal display device which is configured such that the display device includes a substrate which has a thin organic material film formed on an inner surface thereof and a thin conductive oxide film formed to cover at least a part of the thin organic material film, liquid crystal is hermetically filled between the substrate and another substrate which faces the substrate in an opposed manner, and both substrates have peripheries thereof adhered to each other by a seal material, a thermal decomposition temperature of the thin organic material film is not lower than a temperature for forming the thin conductive oxide film, and a heat deflection temperature of the thin organic material film is not higher than the temperature for forming the thin conductive oxide film.

Structure (2):

In the above-mentioned structure (1), the thermal decomposition temperature of the thin organic material film is not lower than 220 degree centigrade (° C.).

Structure (3):

In the above-mentioned structure (1) or (2), the heat deflection temperature of the thin organic material film is not lower than 200 degree centigrade (° C.).

Structure (4):

In any one of the above-mentioned structures (1) to (3), the organic material is formed of epoxy resin.

Structure (5):

In any one of the above-mentioned structures (1) to (4), retention ratio (retentivity, hereinafter) of resistivity of the liquid crystal is equal to or larger than 10% of resistivity of the liquid crystal in an unused condition (that is, as virgin liquid crystal).

Further, a typical example of a fabrication method of a liquid crystal display device according to the present invention is described as following processes (6) to (8).

Process (6):

In a fabrication method of a liquid crystal display device which is configured such that the display device includes a substrate which has a thin organic material film formed on an inner surface thereof and a thin conductive oxide film formed to cover at least a part of the thin organic material film, liquid crystal is hermetically filled between the substrate and another substrate which faces the substrate in an opposed manner, and both substrates have peripheries thereof adhered to each other by a seal material, the method comprises:

a step for forming the thin conductive oxide film at a temperature which falls in a range neither higher than a thermal decomposition temperature of the thin organic material film nor lower than a heat deflection temperature of the thin organic material film.

Process (7):

In the above-mentioned process (6), the thin organic material film is formed at a temperature which falls in a range between 200 degree centigrade (° C.) and 220 degree centigrade (° C.).

Process (8):

In the above-mentioned process (6) or (7), epoxy resin is used as a material of the thin organic material film.

With the use of the above-mentioned substrate, the generation of bubbles from the organic material film can be prevented. Further, it is also possible to suppress the generation of gas (bubbles) in the liquid crystal display device during storage or during use. Accordingly, the liquid crystal display device of high quality and high reliability can be obtained.

Further, by performing the formation of the above-mentioned thin oxide conductive film at a temperature which is equal to or lower than the thermal decomposition temperature of the thin organic material film and equal to or more than the heat deflection temperature of the thin organic material film, the generation of gas (bubbles) in the liquid crystal display device during storage or during use can be suppressed whereby the liquid crystal display device of high quality and high reliability can be fabricated.

The present invention is not limited to the above-mentioned constitutions and various modifications are conceivable within a scope of the technical concept of the present invention.

BRIEF DESCRIPTION OF THE DRAWINGS

FIG. 4 is an exploded perspective view showing respective constitutional parts of the liquid crystal display device which is formed into a module together with lighting means and the like.

DETAILED DESCRIPTION

Figure 1:
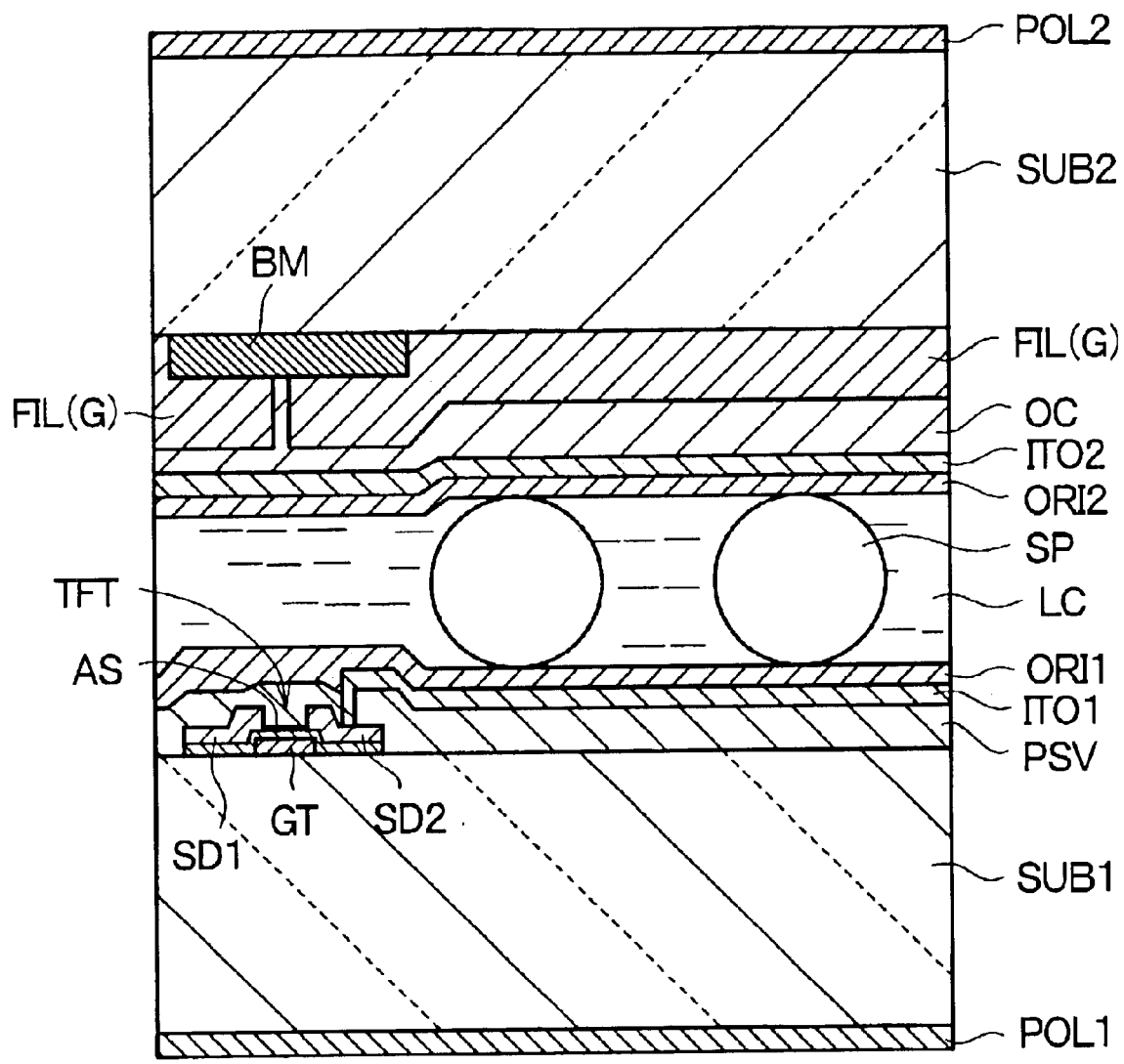
FIG. 1 is a cross-sectional view of an essential part for explaining the constitution of one embodiment of the liquid crystal display device according to the present invention.

Preferred embodiments of the present invention are explained in detail in conjunction with drawings which show these embodiments. FIG. 1 is a cross-sectional view of an essential part for explaining the constitution of one embodiment of a liquid crystal display device according to the present invention. Here, SUB1 indicates a first substrate (hereinafter referred to as an electrode substrate) and SUB2 indicates a second substrate (hereinafter referred to as a counter substrate). Thin film transistors TFT of a usual type are formed on the electrode substrate SUB1. That is, the thin film transistor TFT is configured such that a gate electrode GT, a drain electrode SD1 and a source electrode SD2 are provided while sandwiching an amorphous silicon layer AS therebetween, an insulation film PSV is formed on an inner surface of the electrode substrate SUB1 such that the insulation film PSV covers the thin film transistors TFT, pixel electrodes ITO1 which have one ends thereof connected to the source electrodes SD2 are formed on the insulation film PSV, and a lower orientation film OR1 is formed on the pixel electrode ITO1.

On the other hand, on an inner surface of the counter substrate SUB2, lower filters FIL (only green filter FIL (G) and red filter FIL (R) shown here) are formed and a leveling layer protective film) OC is formed on the lower filters FIL. A common electrode ITO2 is formed on the leveling layer OC such that the common electrode ITO2 covers the leveling layer OC. An upper orientation film OR12 is formed as an uppermost layer.

The above-mentioned leveling layer OC is formed of a thin film made of organic-based epoxy resin which uses polycyclic epoxy resin and bisphenol A-type epoxy resin as main components and to which phenols and imidazole compounds or the like are added. This organic-based epoxy resin has characteristics that the thermal decomposition temperature is 270 degree centigrade (Celsius: ° C.) and this thermal decomposition temperature is a temperature equal to or higher than a temperature for forming a thin oxide conductive film which constitutes the above-mentioned common electrode ITO2.

Further, the heat deflection temperature of this epoxy resin is 220 degree centigrade (° C.) and this heat deflection temperature is equal to the temperature for forming the common electrode ITO2 in this embodiment.

Here, as a material of the above-mentioned leveling layer OC, acrylic resin, polyimide resin or the like can be used besides the above-mentioned epoxy resin. With the use of these resins, a gas generation quantity can be suppressed to a low value.

A pair of substrates SUB1, SUB2 which have the above-mentioned constitution are laminated to each other by interposing spacers SP therebetween to define a given gap therebetween and liquid crystal LC is filled in the gap. Here, polarizers POL1, POL2 are respectively laminated to respective surfaces of a pair of substrates thus constituting the liquid crystal display device.

In the liquid crystal display device of the present invention having such a constitution, the gas generating potential of the above-mentioned counter substrate SUB2 side is measured using a high-accuracy temperature elevation removing gas analyzer such as "EMD-WA 1000 type" (product name) of Denshi Kagaku Ltd. disclosed in the above-mentioned JP-A-2000-171785.

First of all, as measuring conditions of a mass spectrometer MS, a mask fragment method is adopted in which an emission current is set to 50 $\mu$A, a voltage of a secondary electron amplifying tube is set to 2 kV, and 4 channels (m/e=2, 18, 28, 44) are measured at an interval of about 2 seconds. The adjustment of other conditions of the mass spectrometer MS is performed in accordance with a manual attached to the device. Here, m/e=2 indicates a mass of hydrogen ($H_2$), m/e=18 indicates a mass of water ($H_2O$), m/e=28 indicates a mass of carbon monoxide (CO) and m/e =44 indicates a mass of carbon dioxide ($CO_2$).

Here, the counter substrate SUB2 which is served as a specimen is cut into a size of 10 mm×10 mm and is placed on a quartz rod ROD disposed in the a chamber CH.

To perform the mass spectrometric analysis, the degree of vacuum of equal to or lower than $1 \times 10^{-6}$ Pa is established in the heating chamber CH and, thereafter, the heating temperature is elevated from room temperature to 250 degree centigrade (° C.) at a temperature elevation rate of about 10 degree centigrade (° C.)/minute, and an ion peak of m/e=44 ($CO_2$) and the inner pressure of the heating chamber CH are measured. As a result, an integrated value of the above-mentioned ion peak is 25000.

Further, an impact bubble test is performed such that the above-mentioned liquid crystal display device shown in FIG. 1 is held in an atmosphere where the temperature is 50 degree centigrade (° C.) for 30 days and, thereafter, a hard ball having a diameter of about 1 cm is pushed to the liquid crystal display device for 3 seconds with a pushing force of 2 kg under a normal temperature and at a normal pressure so as to form a bubble nucleus of about 1 mm in the liquid crystal display device and time necessary for extinction thereof is measured. Here, the impact bubble test is performed using the device and the method disclosed in the previously-mentioned JP-A-2000-171785.

As a result, although a small bubble is generated at a portion which is pushed by the hard ball, the bubble disappeared 5 minutes after releasing the pushing force. Further, 50 mg of the leveling layer OC of the counter substrate (color filter substrate) SUB2 of the liquid crystal display device LCD shown in FIG. 1 is shaved off and the shaved-off leveling layer is mixed with 3 g of cyano-based liquid crystal in a sample bottle, the mixture is subjected to aging at a temperature of 100 degree centigrade (° C.) for 72 hours and, thereafter, the resistivity (or the specific resistance) of the liquid crystal is measured.

As a result, the retention property (or the retention ratio, hereinafter called as "retentivity") of resistivity of the liquid crystal is 12% of resistivity of the liquid crystal in an unused condition, that is, a virgin liquid crystal. So that it is confirmed that the influence of the leveling layer OC is extremely small. Here, when the retentivity of resistivity of the liquid crystal is less than 10% of the resistivity of the virgin liquid crystal, there arises problems in practical use because of the possibility of lowering of responsibility and the generation of display irregularities and hence, it is desirable to avoid such retentivity.

On the other hand, an impact bubble test is performed with respect to a liquid crystal display device of a comparison example 1 under conditions equal to the conditions of the above-mentioned embodiment and resistivity of the liquid crystal and the like are measured. In the liquid crystal display device of the comparison example 1, as the material of the above-mentioned leveling layer OC, a material disclosed in the previously mentioned JP-A-5-140267 is used. That is, this material includes epoxy resin as a main component to which 1 part by weight of 2E4MZ-CN (product name) produced by Shikoku Kasei Ltd. is added as a hardening promoting agent so as to obtain characteristics in which a heat deflection temperature is 185 degree centigrade (° C.) and a thermal decomposition temperature is 240 degree centigrade (° C.). Here, a film forming temperature of a common electrode ITO2 is 220 degree centigrade (° C.).

As a result, the integrated value of the above-mentioned ion peak is 100000. Further, in the impact bubble test, a small bubble is generated at a portion which is pushed by a hard ball and the bubble is not dissipated even after a pushing force is released, and this bubble is enlarged to a bubble having a diameter of about 15 mm after the lapse of 250 hours at a room temperature. Further, in measuring the resistivity of liquid crystal, the retentivity with respect to the resistivity of the unprocessed liquid crystal, that is, the virgin liquid crystal is lowered to 0.05%.

Further, with respect to the liquid crystal display device of this comparison example 1, the occurrence of wrinkles are observed on a film surface of the common electrode ITO2.

This gives rise to problems such that the wrinkles may cause a gas storing space and, at the same time, the transparency of the film is damaged.

Subsequently, the fabrication method of the liquid crystal display device of the present invention is explained. First of all, to a glass substrate having a thickness of 0.7 mm or 1.1 mm which constitutes a counter substrate (color filter substrate) used in the liquid crystal display device, a photosensitive black resin resist is applied. By exposing, developing and baking such a black resin resist, a black matrix BM is formed. Then, steps similar to the above-mentioned step are repeated using red, green and blue photosensitive resin resists so as to form a red coloring layer FIL (R), a green coloring layer FIL (G) and a blue coloring layer FIL (B).

Subsequently, the leveling layer (protective film) OC is formed by applying the organic epoxy resin having characteristics that the thermal decomposition temperature is 270 degree centigrade (° C.) and the heat deflection temperature is 220 degree centigrade (° C.) and by baking the organic epoxy resin. Then, the transparent electrode ITO is formed on the leveling layer OC by a low-temperature sputtering method at a maximum temperature of 220 degree centigrade (° C.). This transparent electrode ITO constitutes the common electrode. The maximum film forming temperature of 220 degree centigrade (° C.) of the transparent electrode ITO is equal to or below the above-mentioned thermal decomposition temperature of 270 degree centigrade (° C.) and equal to (same temperature) or above the heat deflection temperature of 220 degree centigrade (° C.).

Then, the upper orientation film OR12 is formed by coating and the rubbing treatment is applied to the upper orientation film OR12 so as to give the liquid crystal orientation control performance to the upper orientation film OR12. On the other hand, the electrode substrate (active matrix substrate) side is fabricated in a method similar to the processes for forming the general thin film transistors TFT. That is, by repeating film forming and patterning on a glass substrate having a thickness of 0.7 mm or 1.1 mm, it is possible to form thin film transistors TFT made of amorphous silicon AS, additional capacitances, drain electrodes SD1, source electrodes SD2, gate electrodes GT, pixel electrodes ITO1, a group of various lines such as drain lines and gate lines, and a group of electrodes on the glass substrate. Thereafter, these components are covered with an insulation film PSV and a lower orientation film OR11 is formed on a lower surface of the insulation film PSV by coating. The upper and lower orientation films are applied by offset printing, are baked, and are rubbed in the desired direction (subjected to rubbing treatment) to give the liquid crystal orientation control performance to the upper and lower orientation films.

On a periphery of either one of the counter substrate and the electrode substrate which are formed in the above-mentioned manner, an epoxy-based adhesive material in which a gap regulating member material such as fibers is mixed is applied by screen printing, plastic beads are sprayed as spacers, and one substrate is laminated to another substrate by adhesion. The scattering density of the spacers is approximately 150 pieces/mm$^2$.

An opening for filling liquid crystal is formed in a portion of the above-mentioned seal material. After the seal material is cured or hardened, the liquid crystal is filled through the opening by a vacuum injection method and, thereafter, the opening is sealed with an epoxy-based adhesive material so as to fabricate the liquid crystal display device having the constitution shown in FIG. 1. To further suppress the generation of gas, it is possible to add provisions such as the increase of the hardness of the leveling layer OC or hardening of the leveling layer OC with baking conditions which ensure the highest hardness. Further, it is also effective to bake the transparent electrode ITO at an atmospheric pressure after forming the transparent electrode ITO.

According to such a fabrication method, since the maximum film forming temperature of the transparent electrode ITO formed of a thin conductive oxide film is set to a value which is equal to or below the thermal decomposition temperature of the leveling layer (protective film) OC made of the thin organic material film and is equal to or above the heat deflection temperature, it is possible to suppress the generation of gas (bubbles) in the liquid crystal display device during storage or during use and, at the same time, lowering of the retentivity of resistivity of liquid crystal can be suppressed. Accordingly, the liquid crystal display device of high quality and high reliability can be obtained.

On the other hand, after forming components up to the leveling layer (protective film) OC on the counter substrate under same conditions as the previous embodiment, the transparent electrode ITO is formed on the above-mentioned leveling layer (protective film) OC under the process condition of maximum film forming temperature of 250 degree centigrade (° C.) by a sputtering method. Then, this counter substrate and the electrode substrate of the above-mentioned embodiment are combined to fabricate the liquid crystal display device of a comparison example 2. That is, the liquid crystal display device of the comparison example 2 is characterized in that the maximum film forming temperature of 250 degree centigrade (° C.) of the transparent electrode ITO exceeds the thermal decomposition temperature of 220 degree centigrade (° C.) of the above-mentioned leveling layer (protective film) OC.

With respect to the liquid crystal display device of this comparison example 2, the impact bubble test is performed and the resistivity and the like of the liquid crystal are measured under the same conditions as the previously-mentioned embodiment. As a result, the integrated value of the above-mentioned ion peak is 900000. Further, in the impact bubble test, a small bubble is generated at a portion which is pushed by a hard ball and the bubble is not dissipated even after a pushing force is released, and this bubble is enlarged to a bubble having a diameter of about 13 mm after 250 hours lapse at a room temperature. Further, in measuring the resistivity of liquid crystal, the retentivity with respect to the resistivity of the unused liquid crystal, that is, the virgin liquid crystal is lowered to 1%.

Subsequently, the specific constitutional example of the liquid crystal display device to which the present invention is applied is explained in detail in conjunction with FIG. 2 to FIG. 5.

Figure 2:
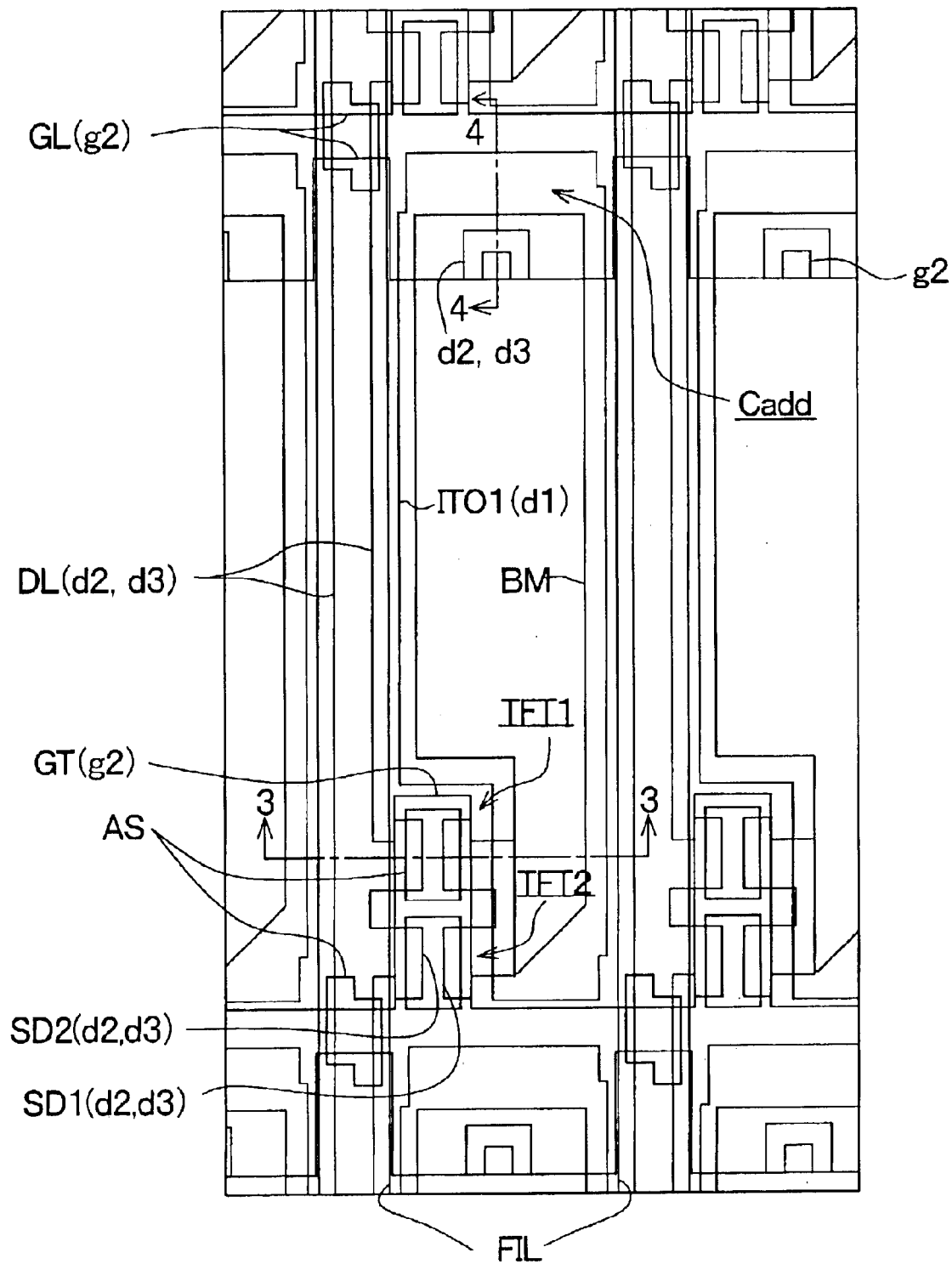
FIG. 2 is a plan view for explaining the constitution of one pixel of the liquid crystal display device to which the present invention is applied and a periphery thereof.

FIG. 2 is a plan view for explaining the constitution of one pixel of the liquid crystal display device to which the present invention is applied and the constitution of a periphery of one pixel. Each pixel is arranged in the a crossing region where two neighboring gate lines GL (in the drawing, gate lines GL(g2)) and two neighboring drain lines DL (data lines DL (d2, d3) cross each other (region surrounded by four signal lines).

Each pixel includes a thin film transistor TFT which forms a switching element (constituted of two thin film transistors TFT1, TFT2), a transparent pixel electrode ITO1 and an additional capacitance (a holding capacitive element) $C_{add}$. A plurality of gate lines GL extend in the x direction (column direction) and are arranged in the y direction (row direction). A plurality of drain lines DL extend in the y direction and are arranged in the x direction.

A gate electrode GT(g2) is connected to the gate line GL, while a drain electrode SD2 (d2, d3) is connected to the drain line DL. Further, the pixel electrode ITO1 (d1) is connected to a source electrode SD1 (d2, d3) of the thin film transistor TFT. Here, AS indicates an amorphous Si layer and d1, d2, d3 and g2 indicate conductive layers which constitute respective electrodes or lines. In the drawing, color filters FIL and a black matrix BM are formed on a color substrate and only their positions in the arrangement are shown in the drawing.

Figure 3:
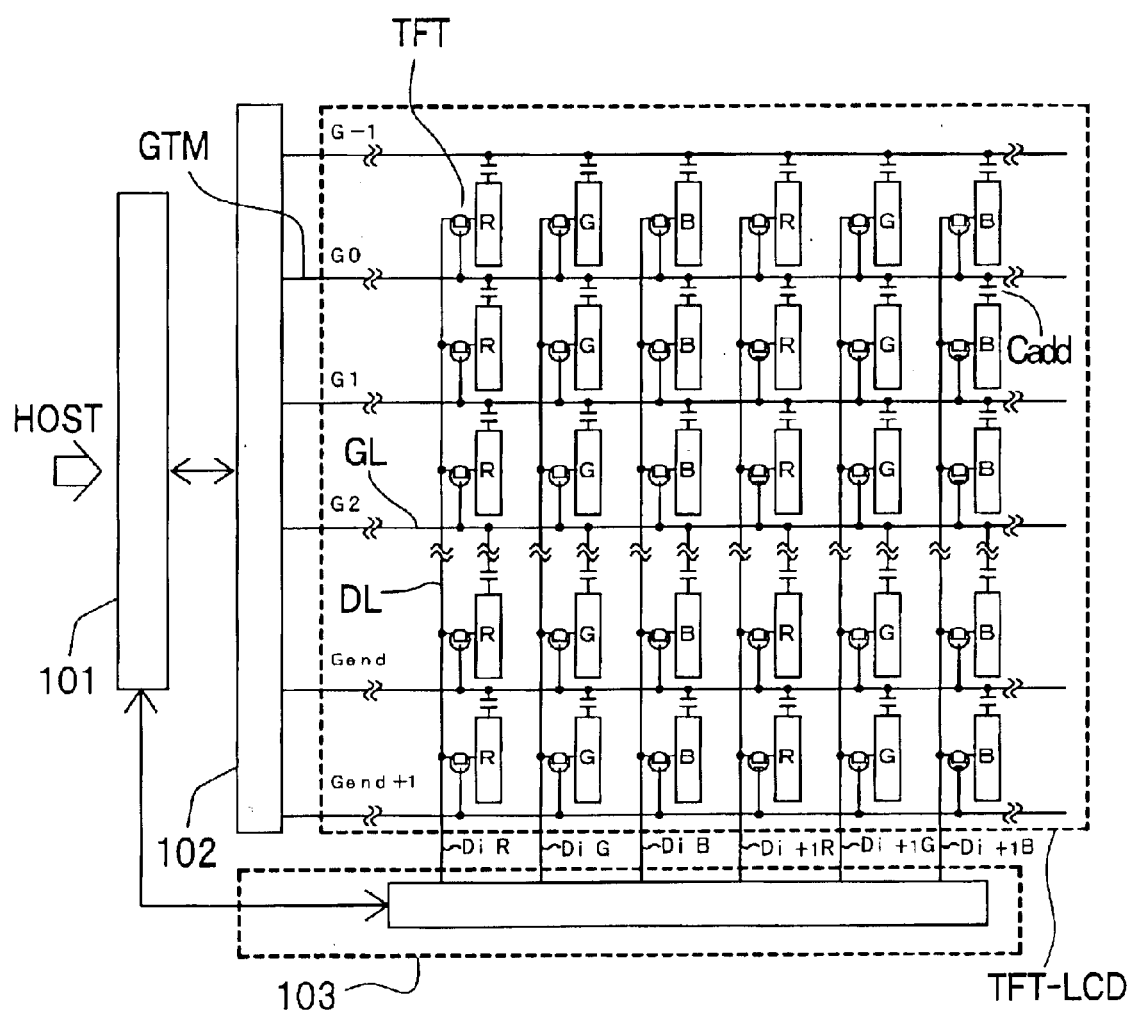
FIG. 3 is a circuit constitutional view of an equivalent circuit of a liquid crystal panel which constitutes the liquid crystal display device and drive circuits or the like which are arranged on an outer peripheral portion of the liquid crystal panel.

FIG. 3 is a circuit constitutional view of an equivalent circuit of a liquid crystal panel which constitutes the liquid crystal display device and drive circuits or the like which are arranged on an outer peripheral portion of the liquid crystal panel. In this constitution, the drain drive circuit part 103 is arranged only on a lower side of a thin film transistor TFT type liquid crystal panel PNL(TFT-LCD) and the gate drive circuit part 104, a controller part 101 and a power source part 102 are arranged on a side face portion of the liquid crystal panel having the XGA specification which is constituted of 800×600 pixels.

The thin film transistor TFT is arranged in a crossing region where two neighboring drain lines DL and two neighboring gate lines GL cross each other. A drain electrode and a gate electrode of the thin film transistor TFT are respectively connected to the drain line DL and the gate line GL.

A source electrode of the thin film transistor TFT is connected to the pixel electrode and a liquid crystal layer is interposed between the pixel electrode and a common electrode and hence, a liquid crystal capacitance ($C_{LC}$) is equivalently connected between the source electrode of the thin film transistor TFT and the common electrode. The thin film transistor TFT becomes conductive when a positive bias voltage is applied to the gate electrode and becomes non-conductive when a negative bias voltage is applied. Further, a holding capacitance $C_{add}$ is connected between the source electrode of the thin film transistor TFT and the preceding gate signal line.

Here, whether the electrode is the source electrode or the drain electrode is basically determined depending on the bias polarity between them and the polarity is reversed during operation in the liquid crystal display device of this embodiment and hence, it is appreciated that the source electrode and the drain electrode are alternated during the operation.

Figure 4:
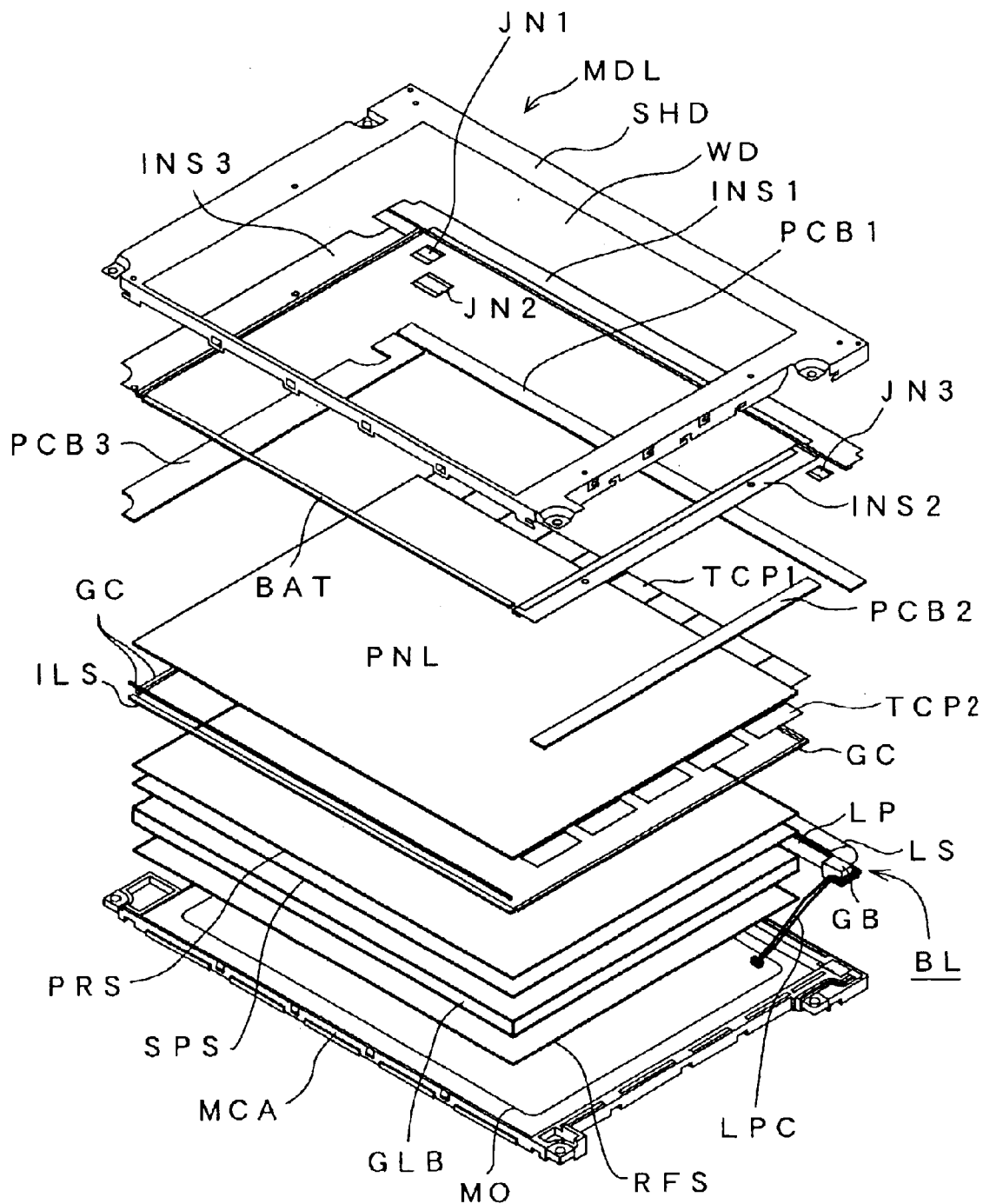

FIG. 4 is an exploded perspective view showing respective constitutional parts of the liquid crystal display device which is formed into a module together with lighting means and the like. SHD indicates a metal-made shield casing (upper frame), WD indicates a display window thereof, PNL indicates a liquid crystal panel, SPS indicates a light diffusion plate, GLB indicates a light guide body, RFS indicates a reflector, BL indicates a backlight, MCA indicates a lower casing (lower frame). A so-called liquid crystal display module MDL is assembled by laminating respective members in accordance with the vertical arrangement relationship shown in the drawing.

The liquid crystal display module MDL has the whole structure thereof fixed by pawls which are formed on the upper frame SHD and hooks which are formed on the lower frame MCA. On the periphery of the upper frame SHD, drive circuit boards (a gate-side circuit board, a drain-side circuit board), a drain-side circuit board PCB1, a gate-side circuit boards PCB2, an interface circuit board PCB3 are connected to the liquid crystal panel PML or are connected to each other among them by means of tape carrier pads TCP1, TCP2 or joiners JN1, JN2, JN3. An upper surface of the liquid crystal display panel PNL and a back surface (an inner wall) of the metal-made shield casing SHD are fixed to each other by a double-sided pressure sensitive adhesive tape BAT, and insulating sheets INS1, INS2, INS3 are inserted among the metal-made shield casing SHD, the drive circuit boards PCB1, PCB2 and the interface circuit board PCB3.

The lower frame MCA is configured to house a light diffusion sheet SPS, a light guide body GLB, a reflector RFS which constitute a backlight BL forming lighting means in an opening MO thereof. Here, a linear lamp (a fluorescent lamp) LP and a reflection sheet LS are disposed on a side face of the light guide body GLB. A lamp cable LP which is held by a rubber bushing GL is pulled out from an end portion of the linear lamp LP and is connected to an inverter power source not shown in FIG. 4.

Light irradiated from the linear lamp LP is irradiated to the liquid crystal display panel PNL side as a uniform illumination light on a display screen by means of the light guide body GLB, the reflector RFS and the light diffusion plate SPS.

A prism sheet PRS which is disposed between the backlight BL and the liquid crystal display panel PNL is served for adjusting a path of illumination light and is laminated by way of a light shielding spacer ILS. Further, a rubber cushion GC is inserted between the liquid crystal display panel PNL and the prism sheet PRS.

Figure 5:
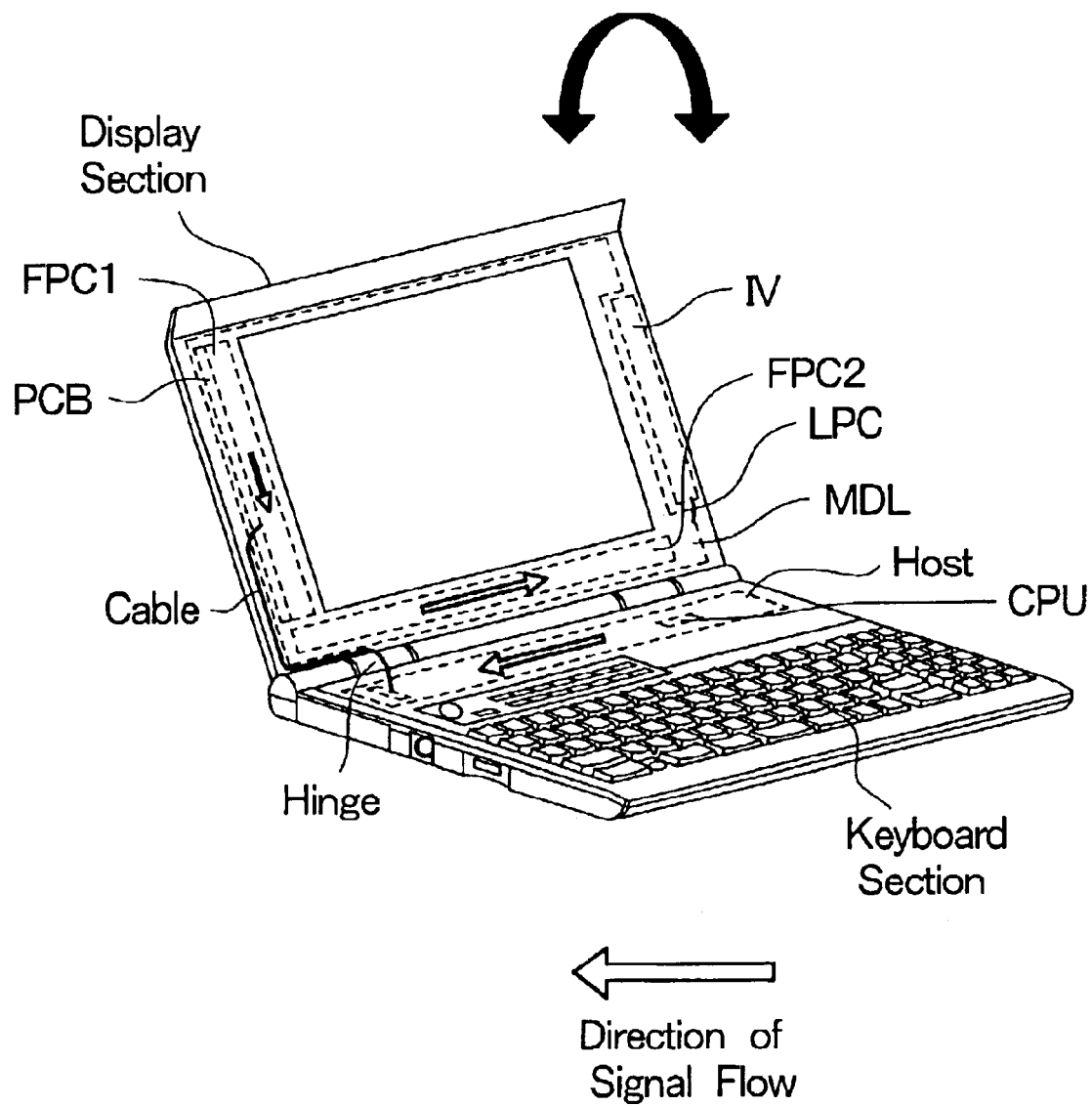
FIG. 5 is a perspective view of a notebook type computer for explaining an example for mounting the liquid crystal display device according to the present invention.

FIG. 5 is a perspective view of a notebook type computer for explaining an example for mounting the liquid crystal display device according to the present invention. The notebook type computer (portable personal computer) includes a keyboard part (a body part) and a display part which is connected to the keyboard part by means of a hinge. A keyboard, a host (a host computer) and a signal generation function part such as a CPU and the like are housed in the keyboard part, while the liquid crystal display module explained in conjunction with the above-mentioned FIG. 4 is mounted on the display part. The liquid crystal display panel PNL which constitutes a display screen is exposed. Then, on a periphery of the liquid crystal display panel PNL, drive circuit boards FPC1, FPC2, a circuit board PCB on which a control chip TCON is mounted and an inverter power source board IV which constitutes a backlight power source and the like are mounted.

Here, the present invention is not limited to the above-mentioned embodiment and various modifications are conceivable without departing from the technical concept of the present invention.

As has been explained heretofore, according to the present invention, even when the liquid crystal display device is stored for a long time or an external force is applied to the liquid crystal display device during use, it is possible to prevent the generation of bubbles from various types of thin films formed on the inner surface of the liquid crystal display panel, particularly from the organic material film such as the leveling layer (overcoat layer) or the like whereby it is possible to provide the highly reliable liquid crystal display device free from a defective display.

What is claimed is:

1. A liquid crystal display device having a substrate which has an organic material film formed on an inner surface thereof and a conductive oxide film formed to cover at least a part of the organic material film, and being assembled together with another substrate facing the substrate adhered thereto with a seal material provided at a periphery thereof and by sealing liquid crystals between the substrate and the another substrate, wherein a thermal decomposition temperature of the organic material film is not lower than temperature for forming the conductive oxide film, and a heat deflection temperature of the organic material film is not higher than the temperature for forming the conductive oxide film.

2. The liquid crystal display device according to claim 1, wherein the heat deflection temperature of the organic material film is not lower than 200° C.

3. The liquid crystal display device according to claim 1, wherein the thermal decomposition temperature of the organic material film is not lower than 220° C.

4. The liquid crystal display device according to claim 1, wherein the organic material film is formed of epoxy resin.

5. The liquid crystal display device according to claim 1, wherein retainability of resistivity of the liquid crystals sealed between the substrate and the another substrate is equal to or larger than 10% of resistivity of the liquid crystals in unused condition.

6. A fabrication method for a liquid crystal display device having a substrate which has an organic material film formed on an inner surface thereof and a conductive oxide film formed to cover at least a part of the organic material film, and being assembled together with another substrate facing the substrate adhered thereto with a seal material provided at a periphery thereof and by sealing liquid crystals between the substrate and the another substrate, comprising:

a step for forming the conductive oxide film at a temperature lying in a range neither higher than a thermal decomposition temperature of the organic material film nor lower than a heat deflection temperature of the organic material film.

7. The fabrication method for the liquid crystal display device according to claim 6, wherein the organic material film is formed at a temperature lying in a range between 200° C. and 220° C.

8. The fabrication method for the liquid crystal display device according to claim 6, wherein epoxy resin is utilized for the organic material film.

* * * * *